United States Patent
Yamamoto et al.

(10) Patent No.: US 10,508,155 B2
(45) Date of Patent: Dec. 17, 2019

(54) METHOD FOR CONTINUOUSLY PRODUCING CELLULOSE ETHER

(71) Applicant: SHIN-ETSU CHEMICAL CO., LTD., Tokyo (JP)

(72) Inventors: Atsushi Yamamoto, Niigata-ken (JP); Shinichi Kurotani, Niigata-ken (JP); Atsuhiko Yonemochi, Niigata-ken (JP); Mitsuo Narita, Niigata-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/858,575

(22) Filed: Sep. 18, 2015

(65) Prior Publication Data
US 2016/0083483 A1 Mar. 24, 2016

(30) Foreign Application Priority Data

Sep. 22, 2014 (JP) .................... 2014-192549

(51) Int. Cl.
| | |
|---|---|
| *C08B 11/00* | (2006.01) |
| *C08B 11/02* | (2006.01) |
| *C08B 11/08* | (2006.01) |
| *C08H 8/00* | (2010.01) |
| *C08B 1/08* | (2006.01) |

(52) U.S. Cl.
CPC .............. *C08B 11/02* (2013.01); *C08B 1/08* (2013.01); *C08B 11/08* (2013.01); *C08H 8/00* (2013.01); *Y02P 20/582* (2015.11)

(58) Field of Classification Search
CPC ....... C08B 11/00; C08B 11/193; C08B 11/02; C08B 11/08
USPC ..................... 536/91, 99, 120, 124
See application file for complete search history.

(56) References Cited

U.S. PATENT DOCUMENTS

| | | | |
|---|---|---|---|
| 3,453,261 A | 7/1969 | Scherff | |
| 3,544,556 A | 12/1970 | Eichenseer et al. | |
| 4,015,067 A | 3/1977 | Liu et al. | |
| 4,091,205 A * | 5/1978 | Onda | A61K 9/2054 514/951 |
| 4,119,538 A * | 10/1978 | Yamauchi | C02F 1/048 110/346 |
| 4,547,570 A | 10/1985 | Garner | |
| 5,840,882 A | 11/1998 | Doenges et al. | |
| 2002/0038018 A1 | 3/2002 | Dannhorn et al. | |
| 2003/0065165 A1 | 4/2003 | Dannhorn et al. | |
| 2015/0040798 A1* | 2/2015 | Kitamura | C08B 1/06 106/172.1 |

FOREIGN PATENT DOCUMENTS

| | | |
|---|---|---|
| CN | 1338474 A1 | 3/2002 |
| CN | 1398900 A | 2/2003 |
| EP | 0 292 242 A2 | 11/1988 |
| GB | 1166060 A | 10/1969 |
| JP | S52-25887 A | 2/1977 |
| JP | H11-21301 | 1/1999 |

OTHER PUBLICATIONS

European Search Report from corresponding European Patent Application No. 15184782.9 dated Dec. 2, 2015.
Office Action for Chinese Application No. 20151068311.0 dated Nov. 21, 2018, 14 pages.
Office Action for Japanese Application No. 2015-181110 dated Jun. 1, 2018, 3 pages.

* cited by examiner

*Primary Examiner* — Shaojia A Jiang
*Assistant Examiner* — Everett White
(74) *Attorney, Agent, or Firm* — Rimon, P.C.

(57) ABSTRACT

Provided is a method for efficiently and continuously producing a cellulose ether containing a reduced amount of indissoluble component. Specifically, the method includes a contact step of bringing pulp into contact with an alkali metal hydroxide solution in the presence of a heat removal solvent to obtain alkali cellulose; a reaction step of subjecting the alkali cellulose to a reaction with an etherifying agent; a partial condensation step, after completion of the reaction, of partially condensing a gas present in a reaction vessel used for the reaction to separate the gas into gas and liquid components for returning some or all of the gas component to the contact step for reuse as some or all of the heat removal solvent; and a step of incinerating the liquid component and, when all of the gas component is not returned to the contact step, the remainder of the gas component.

10 Claims, 1 Drawing Sheet

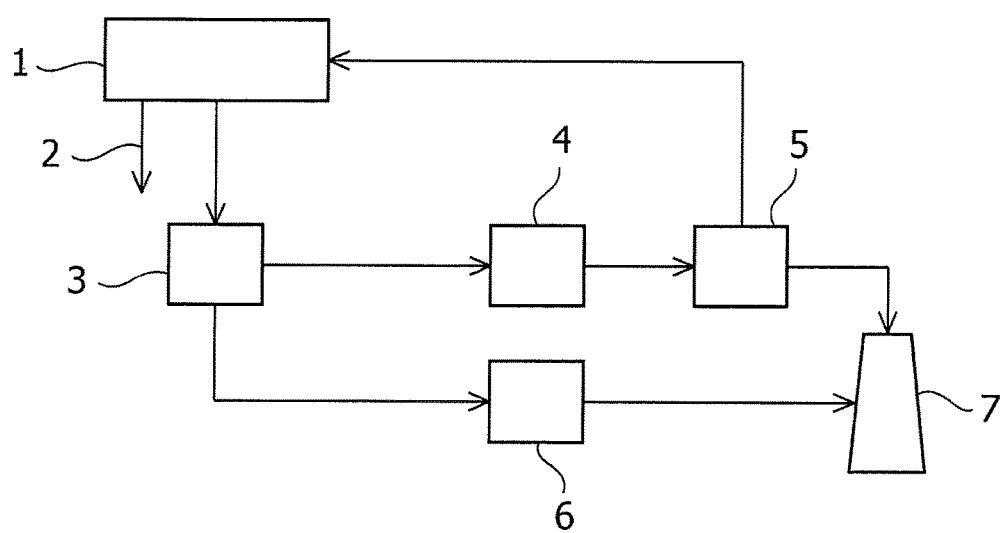

METHOD FOR CONTINUOUSLY PRODUCING CELLULOSE ETHER

FIELD

The present invention relates to a method for continuously producing a cellulose ether such as an alkyl cellulose, a hydroxyalkyl cellulose and a hydroxyalkyl alkyl cellulose.

BACKGROUND

Cellulose ethers have been used in various fields such as industrial fields, food fields and pharmaceutical fields. Reaction slurries typically contain neutralization salts, methanol, alkylene glycols and other by-products generated during the production of cellulose ethers. Some of these by-products interfere with characteristics of the cellulose ether and are substances harmful to human health. Thus, the by-products are required to be removed.

When a cellulose ether is produced, it is difficult to suppress one or more side reactions of an etherifying agent, and after the etherification reaction is over, it is also required to remove a large amount of neutralization salt or salts derived from an alkali used for alkalization of cellulose. The side reactions in the etherification step of the obtained alkali cellulose are exemplified by the hydrolysis of an etherifying agent or the competitive substitution reaction of OH groups of the by-product derived from an etherifying agent. For example, JP 52-25887A discloses a process in which a cellulose ether is continuously produced and, after completion of the reaction, an unreacted etherifying agent and some of the by-product, dimethyl ether, are recovered and reused in the etherification step. The component to be reused, which is a low boiling component in the system after completion of the reaction, is isolated with a partial condenser and returned into a reaction slurry in the reaction system, the reaction slurry being in a process of subjecting the crude product to hydrothermal treatment. The component not to be reused, which is the residue having the low boiling component removed, is circulated into a reaction slurry in the washing system.

SUMMARY

However, when the component not to be reused, such as methanol and alkylene glycols excessively contained by exhaust gas, is circulated into a reaction slurry as in JP 52-25887A, it is necessary to increase the washing load or the washing time during washing of a crude product, thereby causing an increase in effluent load or a reduction in productivity. In addition, a plurality of partial condensers are used and a reflux step is repeated in order to improve the purity of the component to be reused, thereby causing high cost. Furthermore, the present inventors have found that the increase of the number of indissoluble fibers in a cellulose ether cannot be suppressed even when dimethyl ether as a heat removal solvent is added in an etherification step after pulp is brought into contact with an alkali metal hydroxide solution.

An object of the present invention is to provide a method for efficiently and continuously producing a cellulose ether containing a reduced amount of indissoluble component.

According to the present invention, there can be provided a method for continuously producing a cellulose ether comprising: a contact step of bringing a pulp into contact with an alkali metal hydroxide solution in the presence of a heat removal solvent to obtain alkali cellulose; a reaction step of subjecting the alkali cellulose to a reaction with an etherifying agent; a partial condensation step, after completion of the reaction, of partially condensing a gas present in a reaction vessel used for the reaction to separate the gas into a gas component and a liquid component for returning some or all of the gas component to the contact step for reuse as some or all of the heat removal solvent; and an incineration step of incinerating the liquid component and, when all of the gas component is not returned to the contact step, the remainder of the gas component.

According to the present invention, an exhaust gas present in the system after completion of the reaction can be partially condensed to be separated into a liquid component and a gas component, and thus the liquid component can be isolated by a simple operation.

In addition, returning some or all of the gas component to the contact step of bringing pulp into contact with an alkali metal hydroxide solution as some or all of the heat removal solvent allows a temperature increase due to heat generated by mercerization during the formation of alkali cellulose to be suppressed, contrary to returning of the gas component to the etherification step. As a result, the number of indissoluble fibers of a cellulose ether can be reduced. Thus, the solution transparency of the cellulose ether can be improved.

Returning some or all of the gas component to the contact step and incineration of the gas component not returned to the contact step together with the liquid component in a combustion furnace allows some of the exhaust gas present in the system after completion of the reaction to be reused. As a result, by-products including a component not to be reused and an excess of the component to be reused, can be efficiently disposed of.

Partially condensing the exhaust gas present in the system after completion of the reaction to separate the exhaust gas into the liquid component and the gas component allows the ratio of the gas component having a high calorific value for incineration to the liquid component containing a large amount of water, which is a cause of reducing the burning temperature, to be controlled. As a result, the burning temperature can be stabilized so that the substances causing air pollution can be reduced.

BRIEF DESCRIPTION OF THE DRAWINGS

FIG. 1 shows an example of the apparatus to be used for carrying out the present invention.

DETAILED DESCRIPTION

A cellulose ether can be produced by a method comprising a contact step of bringing pulp into contact with an alkali metal hydroxide solution in the presence of a heat removal solvent to obtain alkali cellulose and a reaction step of reacting the alkali cellulose with an etherifying agent.

The pulp may be wood pulp or linter pulp, and may be in the form of sheet, chips or powder.

The alkali metal hydroxide solution can be any solution capable of converting the pulp into alkali cellulose and is preferably an aqueous solution of sodium hydroxide or potassium hydroxide from the standpoint of economic reasons.

The weight ratio of the alkali metal hydroxide to the solid component in the pulp (alkali metal hydroxide/solid component in pulp) is preferably 0.3 to 3.0, more preferably 0.5 to 2.0.

The contact step of bringing the pulp into contact with the alkali metal hydroxide solution to obtain the alkali cellulose is carried out in the presence of a heat removal solvent. Addition of the heat removal solvent in the contact step allows the contact efficiency between the pulp and the alkali metal hydroxide to be improved. A preferable example of the heat removal solvent is dimethyl ether, which is contained by the component to be reused in the exhaust gas. Specifically, the alkali metal hydroxide solution and the heat removal solvent are preferably simultaneously added to the pulp in the contact step. When the heat removal solvent is dimethyl ether, the weight ratio of dimethyl ether to the solid component in the pulp (dimethyl ether/solid component in pulp) is preferably 0.1 to 5.0, more preferably 0.2 to 1.0.

Examples of the etherifying agent include alkyl halides such as methyl chloride and monochloroethane; and alkylene oxides such as ethylene oxide and propylene oxide. The molar ratio of the alkyl halide to the alkali metal hydroxide (alkyl halide/alkali metal hydroxide) is preferably 0.8 to 5.0, more preferably 0.9 to 2.0. The weight ratio of the alkylene oxide to the solid component in the pulp (alkylene oxide/solid component in pulp) is preferably 0.05 to 3.0, more preferably 0.1 to 1.0.

Examples of the cellulose ether include an alkyl cellulose such as methylcellulose (MC) and ethylcellulose (EC); a hydroxyalkyl cellulose such as hydroxypropyl cellulose (HPC) and hydroxyethyl cellulose (HEC); and a hydroxyalkyl alkyl cellulose such as hydroxypropyl methyl cellulose (HPMC) and hydroxyethyl methyl cellulose (HEMC).

Examples of the alkyl cellulose include methylcellulose having a degree of substitution (DS) of methoxy group of 1.0 to 2.2. Examples of the hydroxyalkyl cellulose include hydroxyethyl cellulose having a molar substitution (MS) of hydroxyethoxy group of 0.05 to 3.0 and hydroxypropyl cellulose having MS of hydroxypropoxy group of 0.05 to 3.3. Examples of the hydroxyalkyl alkyl cellulose include hydroxyethyl methyl cellulose having DS of methoxyl group of 1.0 to 2.2 and MS of hydroxyethoxyl group of 0.1 to 0.6 and hydroxypropyl methylcellulose having MS of methoxyl group of 1.0 to 2.2 and MS of hydroxypropoxyl group of 0.1 to 0.6. Generally, DS represents the degree of substitution and is an average number of hydroxy groups substituted by methoxy groups or ethoxy groups per glucose ring unit of a cellulose. MS represents the molar substitution number and is an average molar number of hydroxypropoxyl groups or hydroxyethoxyl groups added per glucose ring unit of a cellulose. DS and MS can be calculated from the results obtained in accordance with the measurement method described in the Japanese Pharmacopoeia.

The composition of the exhaust gas after completion of the reaction of alkali cellulose with an etherifying agent varies depending on a type of the etherifying agent used.

When methyl chloride is used as the etherifying agent, the methyl chloride is reacted with an alkali metal hydroxide solution to produce methanol as a by-product, and the byproduct methanol is reacted with methyl chloride under caustic conditions to produce dimethyl ether as a by-product.

When propylene oxide is used as the etherifying agent, the propylene oxide is reacted with water to produce propylene glycol or polypropylene glycol, and the propylene glycol is reacted with methyl chloride to produce propylene glycol monomethyl ether, propylene glycol dimethyl ether or other by-products.

When ethylene oxide is used as the etherifying agent, the ethylene oxide is reacted with water to produce ethylene glycol or polyethylene glycol, and the ethylene glycol is reacted with methyl chloride to produce ethylene glycol monomethyl ether, ethylene glycol dimethyl ether, or other by-products.

Accordingly, for example, when both methyl chloride and propylene oxide are used as the etherifying agent and dimethyl ether is used as the heat removal solvent to produce hydroxypropyl methylcellulose, unreacted methyl chloride and by-products including dimethyl ether, methanol and propylene glycols are present in the system after completion of the reaction.

Table 1 lists by-products probably generated by the method for producing a cellulose ether through the reaction of alkali cellulose with an etherifying agent.

TABLE 1

| Substance name | Boiling point *1 (° C.) | Origin |
| --- | --- | --- |
| Methyl chloride | −23.7 | starting material |
| Dimethyl ether | −24.8 | starting material, by-product from methyl chloride |
| Ethylene oxide | 10.7 | starting material |
| Propylene oxide | 33.9 | starting material |
| Methanol | 64.6 | by-product from methyl chloride |
| Ethylene glycol dimethyl ether | 84.7 | by-product from ethylene oxide |
| Propylene glycol dimethyl ether | 96.0 | by-product from propylene oxide |
| Water | 100 | starting material, by-product from alkali metal hydroxide |
| Propylene glycol monomethyl ether | 118 | by-product from propylene oxide |
| Ethylene glycol monomethyl ether | 124 | by-product from ethylene oxide |
| Dipropylene glycol dimethyl ether | 150 | by-product from propylene oxide |
| Diethylene glycol dimethyl ether | 159.6 | by-product from ethylene oxide |
| Propylene glycol | 188.2 | by-product from propylene oxide |
| Dipropylene glycol monomethyl ether | 189 | by-product from propylene oxide |
| Diethylene glycol monomethyl ether | 194.2 | by-product from ethylene oxide |
| Ethylene glycol | 197.6 | by-product from ethylene oxide |
| Dipropylene glycol | 233 | by-product from propylene oxide |
| Diethylene glycol | 245 | by-product from ethylene oxide |

*1 Boiling points are measured at a standard atmospheric pressure of 1 atm.

After the reaction of alkali cellulose with an etherifying agent, the resulting cellulose ether is washed preferably with water, more preferably with hot water of 80 to 100° C., in a washing step. As a result of the washing, a neutralization salt, methanol, propylene glycols and the like in the slurry can be removed.

The washed cellulose ether is dried in a drying step and optionally pulverized in an optional pulverization step to provide the end product.

The number of indissoluble fibers in the cellulose ether as the end product can be determined as follows. The cellulose ether is dissolved in an aqueous electrolyte solution for coulter counter, ISOTON II (product by Coulter Corporation) in a constant temperature bath of 5° C. so as to prepare a 0.1% by weight aqueous solution; and the number of undissolved fibers having a length of 16 μm or more but not more than 200 present in 2 ml of the solution is counted by using an aperture tube having a diameter of 400 μm and a Coulter Counter TA II or a Multisizer manufactured by Coulter Corporation. The number of undissolved fibers in a cellulose ether varies depending on DS and MS of the cellulose ether. In order to produce a cellulose ether having a high solution transparency, the number of fibers having a length of 16 μm or more is preferably 500 or less, and the number of fibers having a length of 38 μm or more is preferably 200 or less.

The treatment of the exhaust gas present in the system after completion of the reaction will next be described. Specifically, the exhaust gas present in the reaction vessel after completion of the reaction is partially condensed on the basis of the difference in the boiling point, thereby being separated into a gas component and a liquid component. The partial condensation can be carried out preferably by using a partial condenser.

The gas component to be reused is a component mainly comprising dimethyl ether and unreacted methyl chloride, propylene oxide or ethylene oxide in large amounts, but is preferably free from propylene oxide or ethylene oxide. This is because when the gas component containing propylene oxide or ethylene oxide is reused to produce methylcellulose, propylene oxide or ethylene oxide is reacted with alkali cellulose to form a hydroxypropoxy group or a hydroxyethoxy group. The contents of propylene oxide and ethylene oxide can be reduced by controlling the pressure and the temperature of a partial condenser.

The liquid component not to be reused is a component mainly comprising methanol, water, propylene glycols or ethylene glycols in a large amount.

The gauge pressure of the partial condenser is preferably 0 to 2.0. MPa, more preferably 0.2 to 0.4 MPa, from the standpoint of maintaining the resolution of the treatment. The separation with a partial condenser allows about 95% by weight of water vapor, about 90% by weight of propylene glycols, about 90% by weight of ethylene glycols and about 80% by weight of methanol to be removed from the exhaust gas. The separation with a partial condenser can be carried out in the same manner regardless of which production of an alkyl cellulose, a hydroxyalkyl cellulose or a hydroxyalkyl alkyl cellulose is carried out.

The temperature of the partial condenser is preferably 10 to 40° C., more preferably 10 to 20° C., from the standpoint of the separation of methanol or the like not to be reused and the recovery of substances to be reused.

The liquid component not to be reused, mainly comprising methanol, water, propylene glycols or ethylene glycols in a large amount and being removed by the partial condenser, is incinerated in a combustion furnace. It is preferred, from the standpoint of controlling the supply amount of the liquid component to a combustion furnace, to first transfer the liquid component to a storage tank for storing and then incinerate the liquid component in the combustion furnace.

The substances to be transferred to the storage tank may be any substances because by-products vary depending on the type of a cellulose ether. The substances contain preferably 10 to 30% by weight of, more preferably 15 to 20% by weight of dimethyl ether which is contained by the water removed by the partial condenser; preferably 20 to 60% by weight of, more preferably 30 to 50% by weight of water; preferably 10 to 40% by weight of, more preferably 20 to 30% by weight of methanol; preferably 10 to 30% by weight of, more preferably 10 to 20% by weight of propylene glycols; and preferably 10 to 30% by weight of, more preferably 10 to 20% by weight of ethylene glycols.

The gas component to be reused, mainly comprising unreacted methyl chloride, dimethyl ether, propylene oxide or ethylene oxide, which has been separated by the partial condenser, is preferably transferred to a total condenser for liquefaction. The liquefied component can be stored in a recovery tank. The recovery tank contains unreacted methyl chloride and the like separated with the partial condenser, and dimethyl ether and the unreacted methyl chloride can be used for another production of cellulose ether.

The temperature of the total condenser is preferably from −40 to 10° C., more preferably from −30 to 0° C. from the standpoint of recovering the separated component to be reused, mainly comprising unreacted methyl chloride, dimethyl ether, propylene oxide or ethylene oxide in a large amount. The pressure of the total condenser is preferably 0 to 2.0 MPa, more preferably 0 to 0.4 MPa as with the partial condenser.

Selecting the operation conditions of the partial condenser and the total condenser in the above preferred ranges, the components to be reused can be recovered at high purities on the basis of the difference in boiling points of the components to be reused. This eliminates the need for a plurality of partial condensers or the repetition of a reflux step, thereby enabling an increase in productivity and a cost reduction.

When dimethyl ether as the component to be reused is present in an amount larger than the amount to be used for another production of cellulose ether, the excess dimethyl ether can be incinerated. Dimethyl ether can be reused as the heat removal solvent during the reaction, and the amount of dimethyl ether can be changed depending on the type of a cellulose ether to be produced. When a recovery tank for temporarily storing dimethyl ether is installed, required amounts of unreacted methyl chloride, dimethyl ether, propylene oxide and ethylene oxide to be reused can be taken out of the recovery tank.

The component to be reused is returned to the contact step of bringing pulp into contact with an alkali metal hydroxide solution for another production of cellulose ether. Specifically, the alkali metal hydroxide solution and the component to be reused are preferably simultaneously added to the pulp. When the component to be reused and the pulp are placed and then brought into contact with an alkali metal hydroxide solution, the component to be used may interfere with the contact between the alkali metal hydroxide solution and the pulp so that inhomogeneous alkali cellulose may be produced. This may increase the number of indissoluble fibers in a cellulose ether. On the other hand, when the pulp is brought into contact with an alkali metal hydroxide solution and then the component to be reused is added thereto, an increase in temperature due to heat generated by mercerization during formation of alkali cellulose may not be suppressed. This may increase the number of indissoluble fibers of a cellulose ether.

The furnace temperature in the combustion furnace for incinerating a component not to be reused can be any temperature equal to or higher than the temperature at which the component is burned. The temperature is preferably 900 to 1,000° C., more preferably 950 to 980° C. from the standpoint of reduction of smoke and soot to 0.25 g/Nm$^3$ or less and reduction of NOx to 150 vol ppm or less. The incineration can reduce an effluent load and also can reduce release of harmful substances such as smoke and soot and NOx into the atmosphere.

In a typical method for producing a cellulose ether, the treatment of an exhaust gas present in the system after completion of the reaction includes release into the atmosphere, dilution by using a large amount of water or the like, or decomposition by using aerobic or anaerobic microorganisms. From the standpoint of air pollution and water pollution, the method of using microorganisms to decompose organic substances is most frequently employed.

However, methyl chloride, ethylene oxide and propylene oxide in an exhaust gas have sterilization effect, so that an exhaust gas containing such substances in large amounts lowers the bioactivity of microorganisms, thereby reducing the treatable amount of organic substances. In addition, some by-products cannot be decomposed by microorganisms, and cause water pollution. Furthermore, the treatment with microorganisms requires a vast area for installation of a treatment apparatus in which the microorganisms decompose organic substances, and also requires much labor for the maintenance of the microorganisms, leading to high maintenance cost.

The incineration is preferable from the standpoint of converting the exhaust gas into non-toxic substances in comparison with the method of releasing into the atmosphere toxic gas such as methyl chloride, ethylene oxide or propylene oxide contained by the exhaust gas present in the system after completion of the reaction. In addition, the incineration of methanol, propylene glycols and ethylene glycols, which are components not to be reused, can reduce the amount of effluent treatment. Further, the incineration in a combustion furnace allows a smaller installation area, simple maintenance and use of the heat during combustion. The treatment through thermal decomposition can be carried out regardless of the type of component in the exhaust gas.

When a component to be reused such as dimethyl ether is in excess, some of the component can be incinerated to reduce the treatment amount of effluent containing dimethyl ether. The content of the component to be reused in an incineration object is preferably 0 to 80% by weight, more preferably 40 to 80% by weight, even more preferably 60 to 80% by weight.

An example of the apparatus usable for carrying out the present invention will next be described with reference to FIG. 1.

In a reaction vessel 1, alkali cellulose obtained by bringing pulp into contact with an alkali metal hydroxide solution in the presence of a heat removal solvent such as dimethyl ether can be reacted with an etherifying agent, producing a cellulose ether as the end product 2. After completion of the reaction, the gas present in the reaction vessel 1 is partially condensed with a partial condenser 3 for separation into a liquid component and a gas component. The gas component is preferably liquefied with a total condenser 4 and is stored in a recovery tank 5. Some or all of the liquefied gas component in the recovery tank 5 is returned to the contact step and is used as the heat removal solvent. The liquid component is preferably stored in a storage tank 6. The stored liquid component and, if there is an excess of the gas component which will not be returned to the contact step, the remainder of the gas component are incinerated in a combustion furnace 7.

EXAMPLES

Example 1

As the first production of a cellulose ether, 100 parts by weight of pulp powder was placed in an autoclave with an internal stirrer, and the autoclave was thoroughly purged with nitrogen. With stirring at 60° C., 45 parts by weight of dimethyl ether and 250 parts by weight of 49% by weight aqueous sodium hydroxide solution were simultaneously sprayed to the pulp in the autoclave over 20 minutes to produce alkali cellulose. Next, 160 parts by weight of methyl chloride and 50 parts by weight of propylene oxide were added thereto, and reacted at 60 to 90° C. for 2 hours.

The exhaust gas after completion of the reaction was recovered by using a partial condenser adjusted to have a temperature of 20° C. and a recovery pressure of 0.2 MPa. The liquid component liquefied in the partial condenser, which was not to be reused, was recovered into a storage tank. The liquid component in the partial condenser was analyzed with a gas chromatograph manufactured by Shimadzu Corporation. The liquid component (component not to be reused in the storage tank) in the partial condenser contained 16% by weight of dimethyl ether, 0.2% by weight of methyl chloride, 18% by weight of methanol, 49% by weight of water and 16% by weight of propylene glycols. This result revealed that the component not to be reused was able to be separated. The gas component that had not been liquefied in the partial condenser was recovered by using a total condenser adjusted to have a temperature of −6° C. and a pressure of 0.2 MPa. The totally condensed liquid corresponding to the recovered gas component contained 85% by weight of dimethyl ether, 15% by weight of methyl chloride, 0.3% by weight of methanol, 0.1% by weight of water and 0.1% by weight of propylene glycols. This result revealed that the gas component to be reused was able to be recovered with the total condenser. The gas component to be reused which had been recovered with the total condenser, was stored in a recovery tank. About 60% by weight of the gas component in the recovery tank was reused in the second production of the cellulose ether in the place of the dimethyl ether used in the first production of the cellulose ether. The remaining 40% by weight of the gas component was stored in the recovery tank for the incineration in a combustion furnace.

The liquid in the storage tank which stored the liquid component not to be reused after separation by the partial condenser, was incinerated in a combustion furnace. The combustion furnace had a temperature of 950° C., and the solution of water, methanol, propylene glycols and ethylene glycols in the storage tank was supplied at 0.8 part by weight/h into the combustion furnace. The gas discharged from the chimney of the combustion furnace contained smoke and soot of 0.1 g/Nm$^3$ or less and NOx of 100 volume ppm or less.

In the second production of the cellulose ether, as the treatment of by-products in the crude product after completion of the reaction, the crude product was formed into a reaction slurry with hot water of 90° C., and subjected to washing treatment. The slurry after the washing treatment was dried and pulverized to produce the cellulose ether having an average particle size of 60 μm as the end product. In the cellulose ether, the number of undissolved fibers having a length of 16 μm or more was 80, and the number of undissolved fibers having a length of 38 μm or more was 30. Thus, the cellulose ether had high solution transparency.

Example 2

Incineration was carried out in the same manner as in Example 1 except that some of the component to be reused was incinerated together with the component not to be reused in the combustion furnace. Specifically, the liquid in the storage tank which stored the liquid component not to be reused after separation by the partial condenser, and the liquefied gas component in the recovery tank which had not been reused in the second production of the cellulose ether after separation by the partial condenser and liquefaction by the total condenser, were incinerated in the combustion furnace. The object to be incinerated in the combustion furnace contained 60% by weight of the liquefied gas component from the recovery tank and 40% by weight of the liquid from the storage tank.

The combustion furnace had the temperature of 950° C. The liquefied gas component which was a solution of dimethyl ether and unreacted methyl chloride was supplied at 1.3 part by weight/h into the combustion furnace from the recovery tank; while the liquid in the storage tank which stored the liquid component not to be reused which was a solution of water, methanol, propylene glycols and ethylene glycols was supplied at 0.8 part by weight/h into the combustion furnace from the storage tank. The gas discharged from the chimney of the combustion furnace contained 0.1 g/Nm$^3$ or less of smoke and soot, and 100 vol ppm or less of NOx.

In the second production of the cellulose ether, as the treatment of by-products in the crude product after completion of the reaction, the crude product was formed into a reaction slurry with hot water of 90° C., and subjected to washing treatment. The slurry after the washing treatment was dried and pulverized to produce the cellulose ether having an average particle size of 60 μm as the end product. In the cellulose ether, the number of undissolved fibers having a length of 16 μm or more was 75, and the number of undissolved fibers having a length of 38 μm or more was 20. Thus, the cellulose ether had high solution transparency.

Comparative Example 1

A cellulose ether was produced in the same manner as in Example 1 except that the liquid component not to be reused was not incinerated in a combustion furnace but was supplied to a slurry of the crude cellulose ether after completion of the reaction, and the slurry was washed. Specifically, the cellulose ether was produced in the same manner as in Example 1, and a partial condenser was used to recover dimethyl ether and methyl chloride usable in another production of cellulose ether, from the exhaust gas after completion of the reaction. The other components, methanol and propylene glycols, contained in the exhaust gas were supplied into a reaction slurry into which the crude cellulose ether had been formed with hot water of 90° C. after completion of the reaction, and were subjected to washing treatment. The slurry washed with hot water at 90° C. contained the component not to be reused, so that the amount of hot water required for the washing was 1.2 times as much as that in Example 1.

Comparative Example 2

A cellulose ether was produced in the same manner as in Example 1 except that pulp powder was reacted with sodium hydroxide to obtain alkali cellulose, and then, together with methyl chloride and propylene oxide as the etherifying agent, dimethyl ether as the component to be reused was added in the place of the dimethyl ether used in the first production of a cellulose ether. In other words, the dimethyl ether was returned to the etherification step in the second production of the cellulose ether.

In the cellulose ether obtained through addition of the dimethyl ether after the production of the alkali cellulose for the second production of the cellulose ether, the number of undissolved fibers having a length of 16 μm or more was 600, and the number of undissolved fibers having a length of 38 μm or more was 300. Thus, the cellulose ether had poor solution transparency.

The invention claimed is:

1. A method for continuously producing a cellulose ether, the method comprising:
    a contact step of bringing pulp into contact with an alkali metal hydroxide solution in the presence of dimethyl ether as a heat removal solvent to obtain alkali cellulose;
    a reaction step of subjecting the alkali cellulose to a reaction with an etherifying agent to obtain cellulose ether;
    a partial condensation step, after completion of the reaction, of partially condensing a gas present in a reaction vessel used for the reaction with a partial condenser to separate the gas into a gas component and a liquid component containing 20 to 60% by weight of water for returning some or all of the gas component to the contact step for reuse as some or all of the heat removal solvent; and
    an incineration step of incinerating the liquid component and any remainder of the gas component that has not been returned to the contact step.

2. The method for continuously producing a cellulose ether according to claim 1, further comprising a storage step of storing the liquid component before incinerating the liquid component.

3. The method for continuously producing a cellulose ether according to claim 1, wherein the cellulose ether is selected from the group consisting of an alkyl cellulose, a hydroxyalkyl cellulose and a hydroxyalkyl alkyl cellulose.

4. The method for continuously producing a cellulose ether according to claim 1, wherein the liquid component is selected from the group consisting of methanol and alkylene glycols.

5. The method for continuously producing a cellulose ether according to claim 1, wherein the gas component comprises dimethyl ether and at least one compound selected from the group consisting of methyl chloride, propylene oxide and ethylene oxide.

6. The method for continuously producing a cellulose ether according to claim 1, wherein a weight ratio of alkali metal hydroxide to solid component in the pulp (alkali metal hydroxide/solid component in pulp) is about 0.3 to 3.0.

7. The method for continuously producing a cellulose ether according to claim 1, further comprising washing the cellulose ether with hot water at 80 to 100° C.

8. The method for continuously producing a cellulose ether according to claim 7, further comprising drying the cellulose ether after washing.

9. The method for continuously producing a cellulose ether according to claim 8, further comprising pulverizing the cellulose ether after drying.

10. The method for continuously producing a cellulose ether according to claim 1, wherein the partial condensation step is performed at a pressure from about 0 to 2.0 MPa and a temperature from about 10 to 40° C.

\* \* \* \* \*